United States Patent [19]

Waldorf

[11] Patent Number: 5,041,004

[45] Date of Patent: Aug. 20, 1991

[54] ELECTRICAL CONNECTOR WITH MEANS FOR LIMITING THE TORQUE APPLIED DURING THREADED ENGAGEMENT

[75] Inventor: Joseph F. Waldorf, Sussex, Wis.

[73] Assignee: Cooper Power Systems, Inc., Houston, Tex.

[21] Appl. No.: 479,448

[22] Filed: Feb. 13, 1990

[51] Int. Cl.⁵ ............................................. H01R 13/62
[52] U.S. Cl. .................................... 439/306; 439/801; 439/921
[58] Field of Search ............... 411/1, 6, 7, 8, 949; 439/801, 921, 934, 198, 200, 306

[56] References Cited

U.S. PATENT DOCUMENTS

| 3,383,973 | 5/1968 | Gazal | 411/1 |
| 3,555,491 | 1/1971 | Moss | 411/7 |
| 3,796,985 | 3/1974 | Weber | 339/91 |
| 4,203,641 | 5/1980 | Siebens | 339/75 |
| 4,354,721 | 10/1982 | Luzzi | 339/94 |
| 4,434,736 | 3/1984 | Szostak et al. | 112/258 |
| 4,857,021 | 8/1989 | Boliver et al. | 439/921 |

FOREIGN PATENT DOCUMENTS 2030759  2/1971  Fed. Rep. of Germany .......... 411/6

Primary Examiner—David L. Pirlot
Attorney, Agent, or Firm—Michael, Best & Friedrich

[57] ABSTRACT

Electrical apparatus comprising a housing, a conducting member rotatably supported by the housing and adapted to provide a current path and to threadedly engage another electrical apparatus, and a clutch for transmitting a limited amount of torque from the housing to the conducting member.

29 Claims, 4 Drawing Sheets

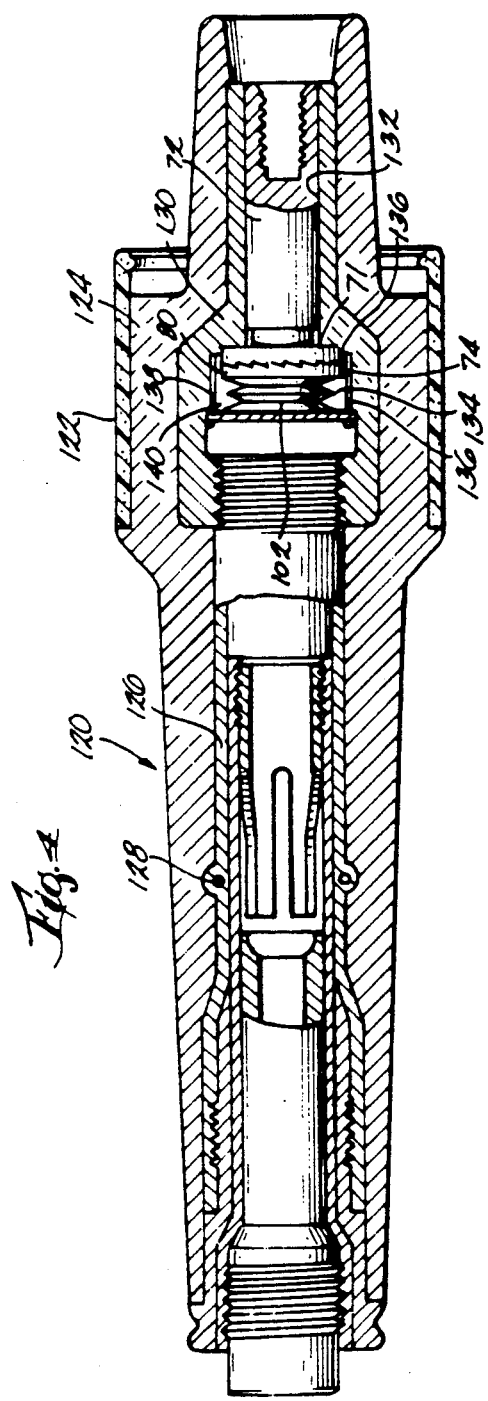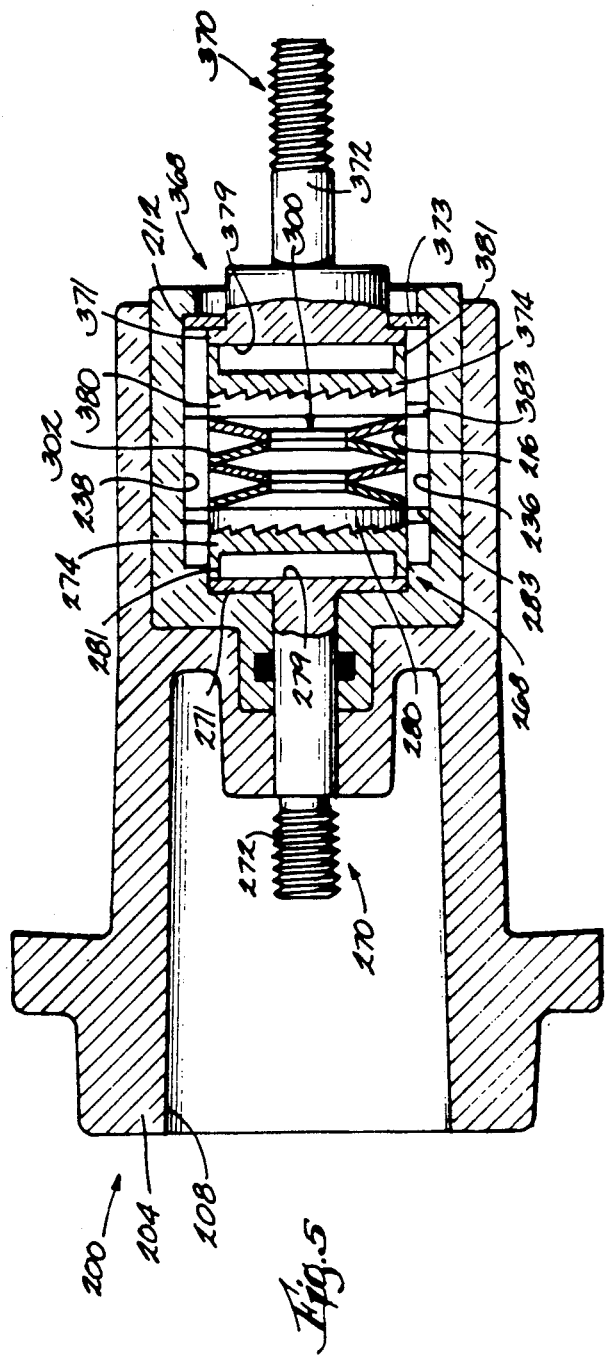

ELECTRICAL CONNECTOR WITH MEANS FOR LIMITING THE TORQUE APPLIED DURING THREADED ENGAGEMENT

BACKGROUND OF THE INVENTION

The present invention relates generally to separable electrical connectors for electrical power distribution systems. More specifically, the invention relates to separable electrical connectors adapted to be threadedly engaged, including transformer bushing well inserts and bushing well receptacles. Still more specifically, the invention relates to an electrically conductive connector having self-contained means for limiting the amount of rotational torque which is applied to the threaded stud of a second electrically conductive connector during the threaded engagement of the two connectors. The present invention also relates to a threadedly engageable electrical connector which is used in circumstances where the relative orientation of the electrical connector when it is securely engaged is important for its intended purposes.

In electrical power distribution systems, and particularly in systems using pad mounted type distribution transformers and switchgear to provide electrical power to commercial sites and residential dwellings, it is often desirable to provide an electrically conductive but separable connection between a high voltage power source feeder cable and an input bushing well of a transformer. For example in such a situation where a pad mounted transformer is used, a high voltage power source feeder cable typically emerges from beneath its buried position in the ground and passes up through a portion of the base of the pad mounted distribution transformer and into an open but enclosable space within the transformer. Once above the ground, the end of the power feeder cable is electrically and mechanically secured to an elbow connector. Bushing well inserts, such as load break inserts and feedthru inserts, are mounted in the walls of the transformer enclosure and are designed to matingly receive elbow connectors and complete the electrical and mechanical connection between the elbow connector and the internals of the distribution transformer. An electrical path connection is provided by means of a threaded stud which is part of the bushing well receptacle and which acts as a male connector. To make a connection with the elbow connector which also is a male type connector, an insert is first threadedly secured to, that is screwed onto, the threaded stud of the bushing well receptacle. Then the elbow connector is slidably engaged into a corresponding female connector in the insert.

By virtue of historical development, the vast majority of bushing well receptacles have studs which are ⅜" in diameter. One problem which may occur in the threading of the insert onto the threaded stud of the bushing well receptacle is that if torque continues to be applied after the insert has been completely threaded onto the bushing well stud, the threaded stud will yield and possibly break. This over-torquing of the threaded stud of the bushing well receptacle may cause a loss in the integrity of the mechanical and electrical connection between the insert and the transformer bushing well. If the bushing well stud is sufficiently over-torqued, the threaded stud may shear off completely, thereby requiring a replacement of the bushing well receptacle. This often requires removal of the entire transformer unit to another location for repair.

An additional problem may arise when a feedthru insert is used. A feedthru (or double bushing) insert has a pair of legs projecting away from the transformer when the feedthru insert's third leg has been threadedly connected to the stud of a transformer bushing well receptacle. Each of the projecting twin legs contains a female connector which is electrically connected internally within the feedthru housing to the female connector in the other twin leg as well as to the female connector which is threadedly engaged to the stud of the bushing well receptacle. When the feedthru insert has been torqued into fixed operative threaded engagement with the stud of the bushing well receptacle, that is, when the feedthru insert has been screwed completely onto the bushing well stud, the twin legs often are not suitably oriented or aligned so as to facilitate, or perhaps even permit, connection to the elbow connectors attached to the power system cables. This is because the power cables rising up through the base of the transformer are relatively stiff and may be of such length that the regions of movement for each of the elbow connectors may not include the twin legs of the feedthru insert so that connections between the twin legs and the elbow connectors can not be made. Or, the outwardly projecting twin legs may be oriented with respect to each other such that one of the legs upon connection to a first elbow connector may interfere with the connection of another elbow connector to the remaining second leg. In the past these situations often have necessitated adjusting the position of the outwardly projecting twin legs by unscrewing or loosening the third leg of the insert at the threaded stud of the transformer bushing well receptacle until the twin legs were rotated into proper alignment for connection with their elbow connectors.

A feedthru insert which allows adjustment of the orientation of the twin legs without unscrewing or loosening the insert on the threaded stud is shown in U.S. Pat. No. 4,203,641. The double bushing insert shown in that patent incorporates an annular shaped, resilient, "louvered" contact element 122 which enables the twin legged portion of the insert, after threaded engagement of the third leg with the bushing well stud is completed, to be partially rotated circumferentially with respect to the bushing without unscrewing the third leg from the bushing well stud (columns 7, lines 22-41); however, the insert has no means for limiting the amount of torque applied to the bushing well stud after completing the threading engagement of the insert onto the stud and further the rotational movement of the twin legs circumferentially around the bushing well receptacle is limited to approximately an arc of 180 degrees.

SUMMARY OF THE INVENTION

The present invention overcomes the problem of over-torquing during threaded engagement of two connectors and also permits 360°, and greater, rotational alignment of the twin legs of a threadedly secured feedthru insert. The present invention also resists the breaking of bushing well studs during installation of inserts and greatly facilitates the installation and use of feedthru inserts.

The present invention enables the construction of improved threaded electrical connectors by permitting connectors to have an integral means for limiting the torque which is transferred from the improved connector to a threaded bolt or stud onto which the connector is screwed.

Alternatively the torque limiting, electrically conductive means of the invention may be integral to a bushing well or other form of male connector which provides a threaded bolt as a means of making a mechanical and electrical connection. The invention includes a ratchet cam overriding clutch arrangement which limits to a pre-selected value the amount of torque applied during the engagement of a threaded female connector with a correspondingly threaded male connector. The clutch arrangement also forms part of the electrical current path when the threaded engagement is complete. When embodied in an insert connector, the invention includes a spring biasing means for maintaining two serrated clutch surfaces in interfitting contact. While the serrated surfaces are in interfitting contact the insert connector may be threaded onto a correspondingly threaded bolt or stud of a bushing well receptacle.

When threaded engagement is complete, that is when the insert connector is tightened onto the threaded stud, any continued force applied to further thread the insert connector onto the stud will result in a torque which exceeds the torque caused by the biasing spring means to maintain the teeth in intermeshing fit and the teeth of one surface will slide or override the teeth of the second surface in an overriding clutch fashion.

Various embodiments of the invention may be used to construct improved bushing well inserts of both the load break and feedthru types as well as improved bushing well receptacles.

DESCRIPTION OF THE DRAWINGS

FIG. 4 is a side view, partly in section, of a load break insert incorporating the invention;

FIG. 5 is a sectional side view of a bushing well receptacle incorporating the invention.

DESCRIPTION OF THE PREFERRED EMBODIMENT

The invention is applicable generally to electrical power system connectors which are threadingly mated. Such connectors include feedthru inserts, load break inserts and bushing well receptacles. For the purpose of describing the invention, a rotatable feedthru insert incorporating the invention in preferred form will first be described.

Figure 2:
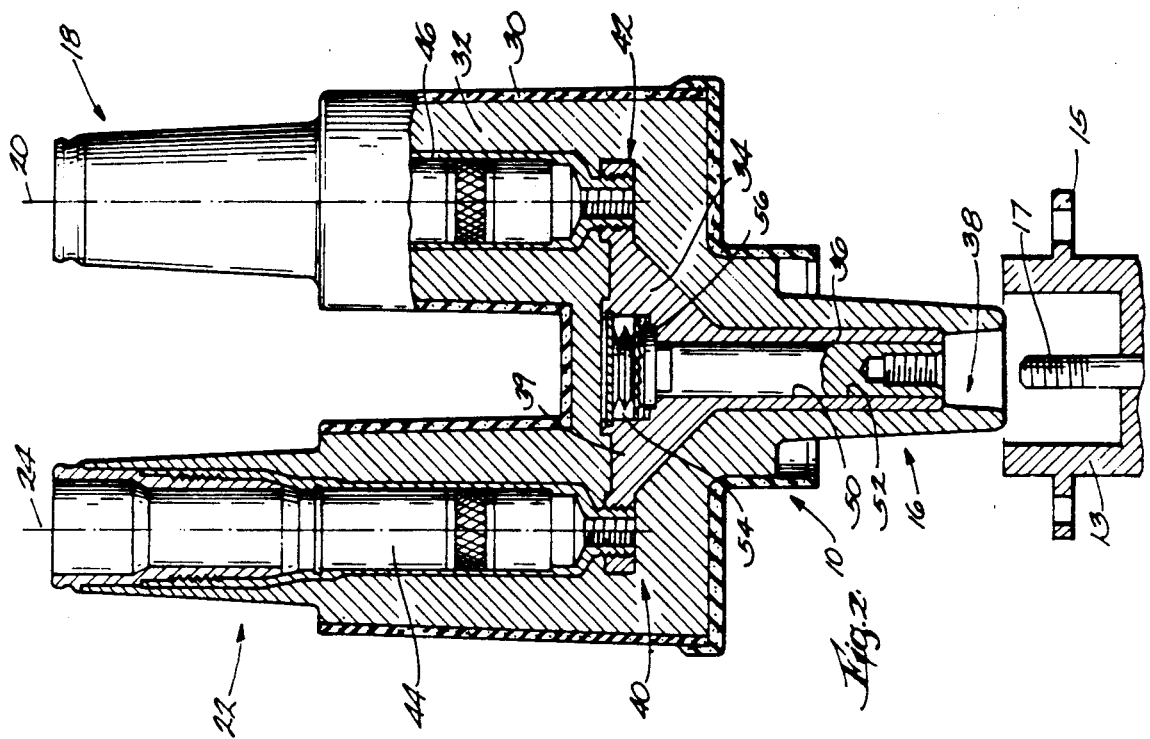
FIG. 2 is a side view, in section, of the rotatable feedthru insert assembly taken along line 2—2 of FIG. 1.
Figure 1:
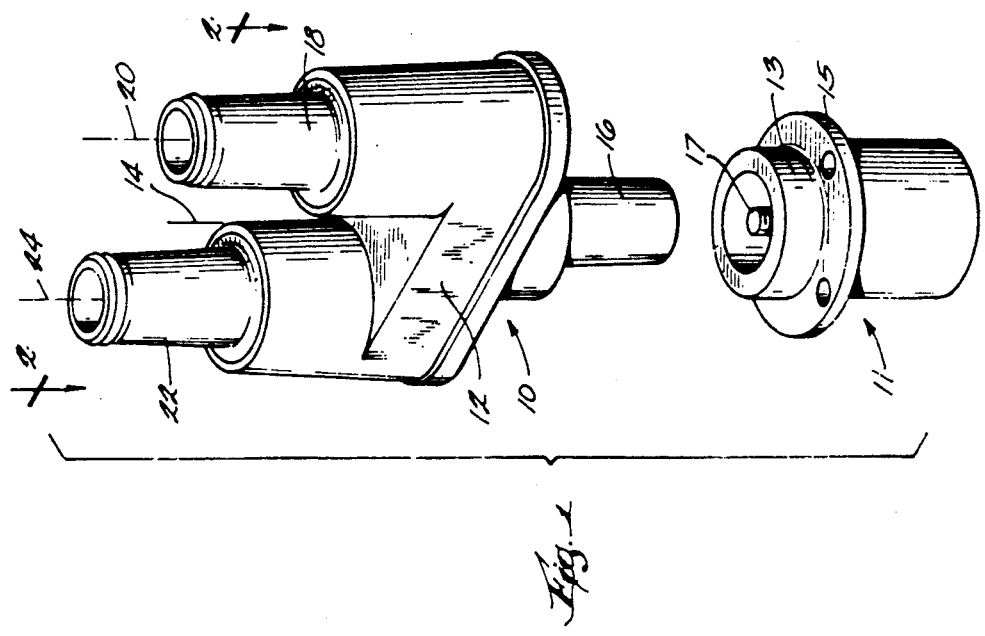
FIG. 1 is an exploded view in perspective illustrating a rotatable feedthru insert assembly constructed in accordance with the invention and a bushing well receptacle of an electrical distribution transformer.

Referring to FIGS. 1 & 2, there is shown a preferred form of a rotatable feedthru insert assembly 10 for electrically connecting a pair of high-voltage, high-current, distribution or feeder cables to a bushing well receptacle 11 of an electrical transformer, such as those typically used to distribute electrical power to commercial and residential users. Such cables and transformers are well known in the art, form no part of the present invention, and therefore have been omitted from the drawing for the sake of clarity. As seen from outside the transformer cabinet enclosure, bushing well 11 comprises a body portion 13 external to the transformer cabinet enclosure side wall, a sidewall mounting flange 15 and a threaded stud 17. Threaded stud 17 is an electrical input connector which provides an electrically conductive path to the internals of the transformer.

Rotatable insert 10 comprises a central portion 12 having an imaginary central axis 14, and a first tubular frustoconically tapered leg portion 16 coaxial to axis 14 and extending substantially downwardly from central portion 12 as shown in FIGS. 1 & 2. Rotatable insert 10 also includes laterally spaced second and third frustoconically tapered leg portions 18 and 22. The leg portions 18 and 22 have respective corresponding imaginary central axes 20 and 24 laterally offset from the center portion axis 14 and generally parallel to and coplanar therewith. Each leg portion 18 and 22 extends substantially upwardly from the central portion 12, which connects leg portions 18 and 22, thus giving rotatable insert 10 a bifurcated or fork-like configuration.

Rotatable insert 10 further comprises (see FIG. 2) an outer sleeve or housing 30 of semi-conductive elastomeric material molded to an inner sleeve or housing 32 of an insulative elastomeric material as is well-known in the art. Disposed internally within downward depending first leg portion 16, second leg portion 18, third leg portion 22, and central portion 12, is a T-bar shaped electrical conductor 34, preferably formed from metal such as copper or a copper based alloy. An upright portion 36 of T-bar conductor 34 is disposed internally within downwardly depending leg portion 16. Upright portion 36 of T-bar conductor 34 comprises a cylindrical sleeve coaxial with imaginary central axis 14. The lowermost end of upright portion 36 terminates in a spaced manner from the lowermost end of leg portion 16. A cylindrical interior space of upright portion 36 is in communication with a cylindrically shaped recess 38 in the lowermost end of first leg portion 16. A cross-bar portion 39 of T-bar conductor 34 has opposing ends 40 and 42, which are respectively connected to identical metallic sleeve members 44 and 46. Each of the sleeve members 44 and 46 forms an electrically conductive housing for a corresponding female connector assembly adapted to receivably engage the contact member or probe of a cooperating, complementary male connecting member, as for example an elbow connector, when the housing of the latter is interfaced with the conically tapered internal surface of the associated leg portion 18 or 22. It is to be understood that the male contact member or probe is adapted to be receivably engaged within the hollow interior afforded by a female connector assembly which is disposed within each corresponding metallic sleeve member 44 or 46. Such engaging male and female connector assemblies are well-known in the art. See, for example, U.S. Pat. No. 4,713,018 owned by the assignee of this application. Any of several designs of female connector assemblies are suitable and the particular design of the female connector assembly does not form part of the invention, its being necessary only that the female connector assembly chosen be such as to provide a good electrical conducting path to its metallic sleeve member, such that when the male contact member or probe is receivably engaged within the female connector assembly, an electrical path is established between the male contact member or probe and T-bar conductor 34. Thus, each of the two female connector assemblies in leg portions 18 and 22 is electrically connected to the electrically conductive T-bar assembly 34.

Figure 3:
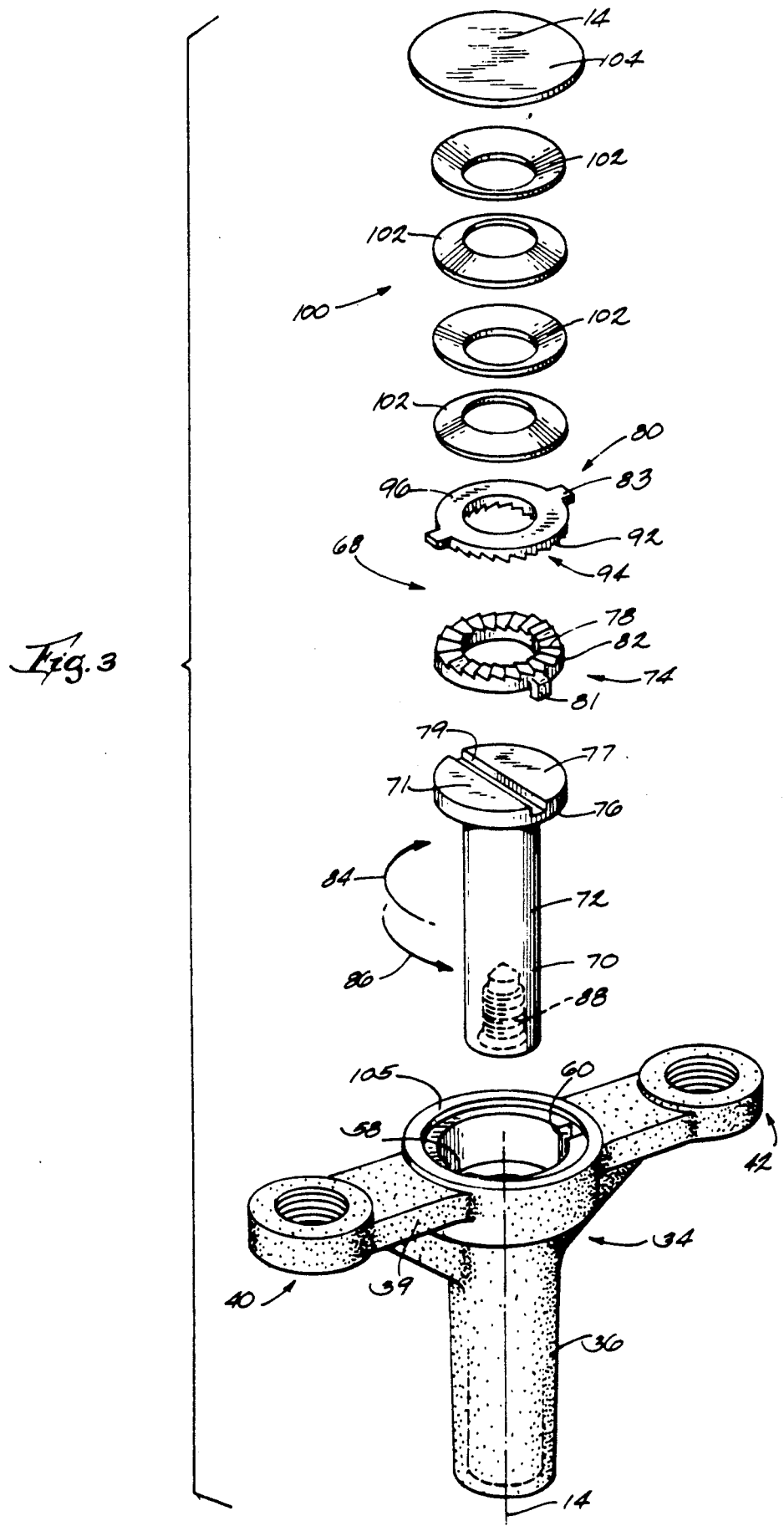
FIG. 3 is an exploded view in perspective illustrating the components of the rotatable feedthru insert assembly.

Referring to FIGS. 2 and 3, T-bar conductor 34 has disposed internally therein a passageway 50. A lower cylindrical portion 52 of passageway 50 extends from the bottom of T-bar conductor 34 upward through upright portion 36 and communicates with cylindrical upper portion 54. Upper passageway portion 54 is of a diameter greater than that of lower passageway portion 52 thereby creating an annular shoulder 56. Disposed in the interior wall surface of the upper passageway portion 54 are grooves or slots, 58 and 60 (FIG. 3), extending radially upward from above shoulder 56 to the top of upper passageway portion 54.

A cam assembly 68 includes (see FIG. 3) a cam stem or conducting member 70, a first cam washer or clutch member 74 and a second cam washer or clutch member 80. Cam stem 70, conductor 34 and sleeve members 44 and 46 define a conductive path between the stud 17 of bushing well 11 and the above-described female contact assemblies. Cam stem 70 has a body portion 72 and a cam head 71. In the preferred embodiment, body portion 72 is a cylindrical sleeve of diameter slightly less than that of lower portion 52 of T-bar conductor passageway 50, and cam head 71 is a circular disc with an outer diameter greater than that of lower portion 52 but slightly less than that of upper portion 54 of passageway 50. Cam head 71 has an annular lower surface 76 and an upper surface 77. Cam head 71 has a groove or slot 79 across its upper surface for accepting lugs 81 of first cam washer 74 when washer 74 is placed in abutting contact with cam head 71. By the interlocking of lugs 81 into slot 79, the rotational movement of first cam washer 74 about imaginary axis 14 is translated to cam stem 70.

The upper surface 78 of first cam washer 74 has disposed thereon a arrangement of serrations or ridges or teeth 82. The teeth 82 extend radially from the center portion of cam washer 74 outward to its edge. When cam washer 74 is stacked on cam stem 70 with lugs 81 inserted into slot 79 and the combination is slidably disposed into T-bar connector 34, the under surface 76 of cam head 71 will rest upon shoulder 56 and thereby prevent further insertion of cam stem 70 into T-bar conductor 34. When thus disposed within T-bar conductor 34, cam stem 70 is free to rotate about imaginary central axis 14 in a first, for example clockwise, direction 84 as well as in a second, for example counterclockwise, direction 86.

To provide a means for effecting a secure mechanical and electrical connection with the stud 17 of transformer bushing well receptacle 11, cam stem body portion 72 has a threaded internal wall portion 88 extending from the bottom of sleeve 72 axially upward. The threaded internal wall portion is adapted to permit its threaded engagement with an externally threaded stud on a conventional bushing well receptacle when cam stem 70 is suitably rotated on the stud.

The teeth 82 on the top surface 78 of cam washer 74 and the serrations or ridges or teeth 92 on the underside 94 of cam washer 80 are made so as to mesh with each other when cam head top surface 78 is brought into abutting engagement with surface 94 of cam washer 80. Cam washer 80 has lugs 83 extending radially outwardly from its outer circumference which fit into slots 58 and 60 of upper passageway 54 of T-bar conductor 34. By the interlocking of lugs 83 into slots 58 and 60, the rotational movement of T-bar conductor 34 is translated to cam washer 80.

On top of and in contact with the top surface 96 of cam washer 80 is a spring means 100 for applying force to maintain teeth 92 in contact with teeth 82. In the preferred embodiment the spring means 100 includes four spring washers 102. Spring washer 102 is sometimes referred to as a disc spring and is well known in the art. Above and in contact with spring means 100 is a retainer disc 104 which serves as a means for compressing spring means 100 and thereby maintaining teeth 82 and teeth 92 intermeshed. Retainer disc 104 is held in place by lip 105 on the uppermost portion of T-bar conductor 34 so as to compress spring means 100. Lip 105 may be crimped over retainer disc 104 or the disc 104 may be cold rolled welded to secure it in place and in compressive contact with spring means 100.

The cam washers 74 and 80, the selection of the number of teeth 82 and 92, the selection of disc springs 102 to obtain the desired "override" torque and other desired parameters for the invention can be designed according to well known engineering principles. However to assist in understanding the invention it may be helpful to refer to the force vector diagram shown below:

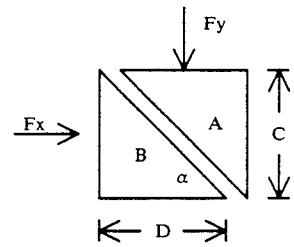

Where:
A represents one of the teeth 92
B represents one of the teeth 82
C represents a tooth height
D represents a tooth width, and
$\alpha$ is the tooth surface slope angle.

By way of example assume that cam head 71, first cam washer 74 and second cam washer 80 each have a diameter of one inch, that the number of teeth 82 or 92 on each cam washer surface is 60, and that the tooth height is 0.017 inch. If it is desired that the rotational force or torque to be applied during threading by the insert 10 to the stud 17 of a bushing well, i.e., the "override" torque, not exceed 15 ft-lbs., the following calculation can be used to approximate the amount of compressive force necessary to prevent the teeth 92 of cam washer 80 from overriding the teeth 82 of cam washer 74:

$$\text{Override torque} = (F_X)(\text{Moment arm})$$

$$F_X = \frac{\text{Override torque}}{\text{Moment arm}}$$

From the force vector diagram:

$$\frac{F_X}{F_Y} = \tan\alpha, \text{ or}$$

$$F_Y = \frac{F_X}{\tan\alpha} = \frac{(\text{Override torque})}{(\tan\alpha)(\text{Moment arm})}$$

-continued $$\tan\alpha = \frac{\text{Tooth height}}{\text{Tooth width}}$$

$$\text{Tooth width} = \frac{\pi(1.0 \text{ inch})}{60}$$

$$= 0.052 \text{ inch approximately}$$

and $\tan\alpha = \frac{0.017}{0.052} = \frac{1}{3}$ approximately.

Therefore, $$F_Y = \frac{(15 \text{ ft-lbs.})(12 \text{ in/ft})}{(\frac{1}{3})(\frac{1}{4} \text{ in})}$$

$$= 1080 \text{ lbs.}$$

Thus as an approximation for the example given, selecting a spring means which exerts no more than approximately 1,000 lbs. force on the upper cam washer 80, the torque applied to the bushing well stud will not exceed 15 ft-lbs.

Cam washers 74 and 80 and spring means 100 constitute clutch means for transmitting a limited amount of torque from sleeves 30 and 32 and conductor 34 to cam stem or conducting member 70. Alternatively stated, insert 10 comprises means for causing rotation of conducting member 70 with conductor 34 in response to rotation of conductor 34 in one rotational direction when the resistance to rotation of conducting member 70 is less than a predetermined amount, and for permitting rotation of conductor 34 relative to conducting member 70 in the one direction when the resistance to rotation of conducting member 70 is greater than the predetermined amount. The clutch means permits at least 360° rotation of conductor 34 relative to conducting member 70 in the one direction when the torque applied to conductor 34 is greater than the predetermined amount, or when the resistance to rotation of conducting member 70 is greater than the predetermined amount. In the illustrated construction, cam washer 80 can override cam washer 74 indefinitely (i.e., for an infinite number of revolutions). Thus, insert 10 can be rotated until leg portions 18 and 22 are in the desired positions. Additionally, while cam washer 80 can override cam washer 74 in the one direction, cam washer 80 cannot override cam washer 74 in the opposite direction. In other words, the clutch means transmits a substantially unlimited amount of torque from conductor 34 to conducting member 70 when conductor 34 is rotated in the opposite rotational direction. Even after cam washer 80 overrides cam washer 74 in the one direction, i.e., after rotation of conductor 34 relative to conducting member 70 in the one direction, the clutch means immediately causes rotation of conducting member 70 with conductor 34 in response to rotation of conductor 34 in the opposite direction.

Insert 10 further comprises means for providing an audible signal (indicating to the operator that the proper torque has been reached) when washer 80 overrides washer 74, i.e., during rotation of conductor 34 relative to conducting member 70. Specifically, washers 74 and 80 make a clicking noise when washer 80 overrides washer 74.

Another embodiment of the present invention is shown in FIG. 4, which shows what is generally referred to in the industry as a load break insert 120. Referring to FIG. 4, the load break insert 120 has a partial outer sleeve 122 of semi-conductive elastomeric material and an inner sleeve 124 of an insulative elastomeric material. Enclosed within inner sleeve 124 is a metallic sleeve member 126 which forms an electrically conductive housing for a corresponding female connector assembly 128 adapted to receivably engage the contact member probe of a complementary male connecting member, as for example an elbow connector. Such engaging male and female connector assemblies are well-known in the art and the particular design of the assemblies do not form part of the invention. Female connector assembly 128 is connected to insert sleeve 130. Both female connector assembly 128 and insert sleeve 130 are made of a conductive material, preferably of copper or a copper based alloy. Insert sleeve 130 includes a passageway having a lower or right passageway portion 132 and an upper or left passageway portion 134, each cylindrically shaped, such that the diameter of the upper passageway portion 134 is greater than that of lower passageway portion 132, thereby forming a shoulder 136 where the two passageway portions meet. Disposed in the interior wall surface of the upper passageway portion 134 are slots 136 and 138 extending in the direction of the axis of the upper passageway portion from shoulder 136 to the retainer disc 140.

The load break insert 120 also includes a cam assembly 168. The cam assembly 168 is substantially identical to the cam assembly 68 shown in FIGS. 1-3, and common elements have been given the same reference numerals. Furthermore, elements of the cam assembly 168 not shown in FIG. 4 are shown in FIG. 3. A cam stem 72 of a diameter slightly less than that of lower passageway portion 132 is disposed within lower passageway portion 132 and has a cam head 71 which is a circular disc with a diameter greater than that of lower passageway portion 132 but slightly less than that of upper passageway portion 134. As discussed above with respect to the feedthru insert shown in FIGS. 1, 2 and 3, cam head 71 has a slot 79 across its upper surface for accepting lugs 81 of a first cam washer 74 when washer 74 is placed in abutting contact with cam head 71. By virtue of the interlocking of lugs 81 into slot 79, the rotational movement of first cam washer 74 about the axis of the lower and upper passageway portions 132 and 134 is translated to cam stem 72. Second cam washer 80 has lugs 83 extending radially outwardly which are fitted into slots 136 and 138 in the inner wall of the upper passageway portion 134 such that rotational movement of insert sleeve 130 is translated to second cam washer 80. A spring means, consisting of disc washers 102, is positioned in the upper passageway portion 134 in contact with the upper or left surface of second cam washer 80 and the lower or right or inner surface of retainer disc 140. The spring means 102 is in compression and exerts a force directed co-axially with the axis of the upper passageway portion 134 which maintains the teeth 92 on second cam washer 80 in intermeshed engagement with the teeth 82 on the upper surface of first cam washer 74 in the manner discussed in connection with the embodiment of the invention for the feedthru insert discussed above and shown in FIGS. 1, 2 and 3.

Another embodiment of the present invention is shown in FIG. 5, which shows what is generally referred to in the industry as a bushing well or bushing well receptacle 200. Referring to FIG. 5, the bushing well 200 includes an outer sleeve or housing 204 of an insulative elastomeric material. The outer sleeve 204 has a right or rearward end and a left or forward end. The forward end has therein a tapered recess 208 adapted to receive the end of a bushing well insert. Enclosed within the outer sleeve or housing 204 is an electrically conductive insert sleeve 212 having therein a passageway 216. Disposed in the interior wall surface of the insert sleeve 212 are diametrically opposed grooves or slots 236 and 238 extending axially of the insert sleeve 204.

The bushing well 200 comprises a cam assembly 268 including a cam stem or conducting member 270, a first cam washer 274 and a second cam washer 280. Except as explained hereinafter, cam washers 274 and 280 are respectively identical to cam washers 74 and 80 shown in FIGS. 1-3. The upper or right surface of cam washer 274 constitutes a clutch surface fixed to conducting member 270. The cam stem 270 has a body portion 272 and a cam head 271. In the illustrated construction, body portion 272 is an externally threaded stud which extends forwardly into the recess 208 and which is adapted to engage the above-mentioned bushing well insert. Cam head 271 has an annular lower or left surface abutting a shoulder defined by insert sleeve 204. Cam head 271 also has an upper or right surface having therein a groove or slot 279 for accepting lugs 281 of first cam washer 274. Second cam washer 280 includes radially extending lugs 283 which fit into slots 236 and 238 in insert sleeve 212 so as to prevent relative rotation of second cam washer 280 and insert sleeve 212.

The bushing well 200 further comprises a second cam assembly 368 including a cam stem or conducting member 370, a first cam washer 374 and a second cam washer 380. Except as explained hereinafter, cam washers 374 and 380 are respectively identical to cam washers 74 and 80 shown in FIGS. 1-3. The upper or left surface of cam washer 374 constitutes a clutch surface fixed to conducting member 370. Cam stem 370 has a body portion 372 and a cam head 371. Body portion 372 defines an externally threaded stud which extends rearwardly from the rearward end of the outer sleeve or housing 204 and which is adapted to engage another electrical apparatus such as a transformer or switchgear. Cam head 371 has an annular lower or right surface abutting an electrically conductive washer 373 which is supported by insert sleeve 212 and which prevents movement of cam stem 370 to the right (as shown in FIG. 5) relative to insert sleeve 212 and outer sleeve 204. Cam head 371 also has an upper surface having therein a groove or slot 379 for accepting lugs 381 of first cam washer 374. Second cam washer 380 includes radially extending lugs 383 which fit into slots 236 and 238 in insert sleeve 212 so as to prevent relative rotation of second cam washer 380 and insert sleeve 212.

The bushing well 200 further comprises means for biasing the cam washers or clutch members 280 and 380 away from each other. While various suitable means can be employed, in the illustrated construction, such means comprises spring means 300 which includes four spring washers 302 located between cam washers 280 and 380.

Clutch members 274, 280, 374 and 380 and spring means 300 constitute means for transmitting a limited amount of torque between outer sleeve 204 and conducting member 270 and for transmitting a limited amount of torque between outer sleeve 204 and conducting member 370. Conducting member 270, insert sleeve 212, washer 373 and conducting member 370 provide a current path from the above-mentioned bushing well insert to the above-mentioned transformer or switchgear.

Figure 6:
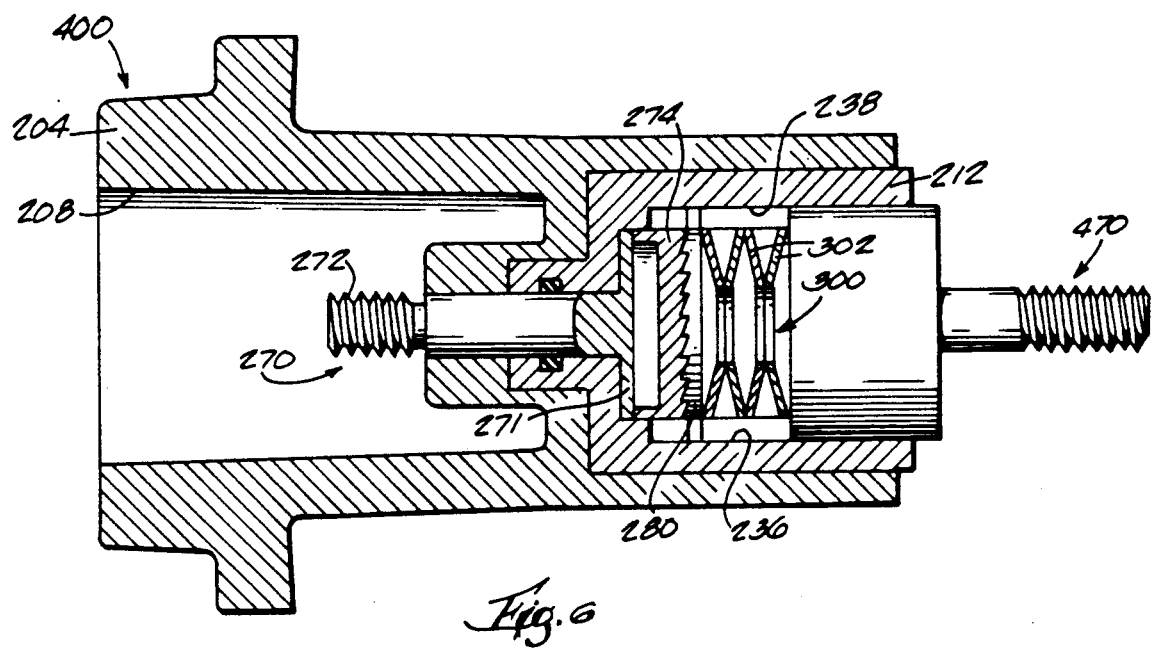
FIG. 6 is a sectional side view of another bushing well receptacle incorporating the invention.

Another embodiment of the present invention is shown in FIG. 6, which shows a bushing well or bushing well receptacle 400. Except as explained hereinafter, bushing well 400 is substantially identical to bushing well 200, and common elements have been given the same reference numerals.

Rather than cam assembly 368, bushing well 400 comprises cam stem 470. Cam stem 470 is fixed to insert sleeve 212, by any suitable means, so that the cam stem 470 is not movable relative to insert sleeve 212. Spring means 300 of bushing well 400 is located between cam washer 280 and cam stem 470 and biases cam washer 280 against cam washer 274. Thus, bushing well 400 includes only one overriding clutch mechanism.

Various features of the invention are set forth in the following claims.

We claim:

1. Electrical apparatus for electrically connecting a power distribution cable to a transformer, said apparatus comprising a housing, a conducting member which is rotatably supported by said housing, which defines a current path between the cable and the transformer, and which threadedly engages another conducting member electrically communicating with one of the cable and the transformer, and clutch means for transmitting a limited amount of torque from said housing to said conducting member.

2. Apparatus as set forth in claim 1 wherein said conducting member is internally threaded.

3. Apparatus as set forth in claim 1 wherein said conducting member is an externally threaded stud.

4. Apparatus as set forth in claim 1 and further comprising an externally threaded stud which is supported by said housing and which electrically communicates with said conducting member.

5. Apparatus as set forth in claim 1 wherein said conducting member is substantially fixed against axial movement relative to said housing.

6. Apparatus as set forth in claim 1 wherein said clutch means includes a first clutch member connected to said housing for common rotation therewith, a second clutch member connected to said conducting member for common rotation therewith, and means for biasing said first clutch member against said second clutch member.

7. Apparatus as set forth in claim 6 wherein said conducting member is supported by said housing for rotation relative thereto about an axis, and wherein said biasing means biases said first clutch member in the direction of said axis.

8. Apparatus as set forth in claim 6 wherein said first clutch member has a serrated surface, wherein said second clutch member has a serrated surface facing said serrated surface on said first clutch member, and wherein said biasing means biases said serrated surfaces toward each other.

9. Apparatus as set forth in claim 1 wherein said clutch means permits rotation of said housing relative to said conducting member in one rotational direction when the torque applied to said housing is greater than a predetermined amount.

10. Apparatus as set forth in claim 9 wherein said clutch means permits at least 360° rotation of said housing relative to said conducting member in said one direction when the torque applied to said housing is greater than said predetermined amount.

11. Apparatus as set forth in claim 9 wherein said clutch means transmits a substantially unlimited amount of torque from said housing to said conducting member when said housing is rotated in the opposite rotational direction.

12. Apparatus as set forth in claim 9 wherein said clutch means provides an audible signal during rotation of said housing relative to said conducting member.

13. Electrical apparatus comprising a housing, a conducting member rotatably supported by said housing and adapted to provide a current path and to threadedly engage another electrical apparatus, clutch means for transmitting a limited amount of torque from said housing to said conducting member, and a contact assembly which is supported by said housing and which electrically communicates with said conducting member.

14. Apparatus as set forth in claim 13 and further comprising a second contact assembly which is supported by said housing and which electrically communicates with said conducting member.

15. Electrical apparatus for electrically connecting a power distribution cable to a transformer, said apparatus comprising a housing, a conducting member which is rotatably supported by said housing, which defines a current path between the cable and the transformer, and which threadedly engages another conducting member electrically communicating with one of the cable and the transformer, and means for causing rotation of said conducting member with said housing in response to rotation of said housing in one rotational direction when the resistance to rotation of said conducting member is less than a predetermined amount, and for permitting rotation of said housing relative to said conducting member in said one direction when the resistance to rotation of said conducting member is greater than said predetermined amount.

16. Apparatus as set forth in claim 15 wherein said means is operable after rotation of said housing relative to said conducting member in said one direction to cause rotation of said conducting member with said housing in response to rotation of said housing in the opposite rotational direction.

17. Apparatus as set forth in claim 15 wherein said means permits at least 360° rotation of said housing relative to said conducting member in said one direction when the resistance to rotation of said conducting member is greater than said predetermined amount.

18. Apparatus as set forth in claim 15 wherein said means provides an audible signal during rotation of said housing relative to said conducting member.

19. Electrical apparatus comprising a bushing well and a bushing well insert, one of said bushing well and said bushing well insert including a first conducting member, and the other of said bushing well and said bushing well insert including a housing, a second conductivity member which is rotatably supported by said housing and which threadedly engages said first conducting member to provide a current path between said bushing well and said bushing well insert, and means for causing rotation of said second conducting member with said housing in response to rotation of said housing in one rotational direction when the resistance to rotation of said second conducting member is less than a predetermined amount, and for permitting rotation of said housing relative to said second conducting member in said one direction when the resistance to rotation of said second conducting member is greater than said predetermined amount.

20. Apparatus as set forth in claim 19 wherein said means permits at least 360° rotation of said housing relative to said second conducting member in said one direction when the resistance to rotation of said second conducting member is greater than said predetermined amount.

21. Apparatus as set forth in claim 19 wherein said means provides an audible signal during rotation of said housing relative to said second conducting member.

22. Electrical apparatus comprising
a housing,
a first conductor member supported by said housing for rotation relative thereto about an axis and adapted to threadedly engage a second electrical apparatus,
a second conducting member supported by said housing for rotation relative thereto about said axis and adapted to engage a third electrical apparatus,
said first and second conducting members providing a current path from the second apparatus to the third apparatus, and
means for transmitting a limited amount of torque between said housing and said first conducting member and for transmitting a limited amount of torque between said housing and said second conducting member, said means including a first clutch surface fixed to said first conducting member, a second clutch surface which is fixed to said second conducting member and which faces said first clutch surface, a first clutch member having a clutch surface facing said first clutch surface, a second clutch member having a clutch surface facing said second clutch surface, and means for biasing said clutch members away from each other.

23. Apparatus as set forth in claim 22 wherein each of said first and second conducting members is an externally threaded stud.

24. Apparatus as set forth in claim 23 wherein said apparatus is a bushing well, wherein said housing has a rearward end and has a forward end having therein a recess adapted to receive a portion of the second apparatus, wherein said first conducting member extends forwardly into said recess, and wherein said second conducting member extends rearwardly from said rearward end.

25. Electrical apparatus comprising a bushing well and a bushing well insert, one of said bushing well and said bushing well insert including a first conducting member, and the other of said bushing well and said bushing well insert including a housing, a second conducting member which is rotatably supported by said housing, and which is adapted to provide a current path and to threadedly engage another electrical apparatus, and clutch means for transmitting a limited amount of torque from said housing to said second conducting member.

26. Apparatus as set forth in claim 25 wherein said second conducting member is substantially fixed against axial movement relative to said housing.

27. Apparatus as set forth in claim 15 wherein said means includes a first clutch member connected to said housing for common rotation therewith, a second clutch member connected to said conducting member for common rotation therewith, and means for biasing said first clutch member against said second clutch member.

28. Apparatus as set forth in claim 22 wherein said conducting member is supported by said housing for rotation relative thereto about an axis, and wherein said biasing means biases said first clutch member in the direction of said axis.

29. Apparatus as set forth in claim 28 wherein said first clutch member has a serrated surface, wherein said second clutch member has a serrated surface facing said serrated surface on said first clutch member, and wherein said biasing means biases said serrated surfaces toward each other.

* * * * *

UNITED STATES PATENT AND TRADEMARK OFFICE
CERTIFICATE OF CORRECTION

PATENT NO. : 5,041,004
DATED : August 20, 1991
INVENTOR(S) : Joseph F. Waldorf and Quinton H. Sutton It is certified that error appears in the above-identified patent and that said Letters Patent is hereby corrected as shown below:

On title page, after "Joseph F. Waldorf, Sussex, Wis.", insert -- Quinton H. Sutton, Waukesha, Wis. --

In Claim 19, column 11, lines 55-56, the word "conductivity" should read -- conducting --.

In Claim 28, column 12, line 67, the words "claim 22" should read -- claim 27 --.

Signed and Sealed this

Eleventh Day of August, 1992

Attest:

DOUGLAS B. COMER

*Attesting Officer*   *Acting Commissioner of Patents and Trademarks*